US008177468B2

(12) United States Patent
Campau

(10) Patent No.: US 8,177,468 B2
(45) Date of Patent: May 15, 2012

(54) LOCKING THREADED CONNECTION

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 649 days.

(21) Appl. No.: 11/955,736

(22) Filed: Dec. 13, 2007

(65) Prior Publication Data
US 2009/0097940 A1 Apr. 16, 2009

Related U.S. Application Data

(63) Continuation-in-part of application No. 11/872,163, filed on Oct. 15, 2007, now Pat. No. 8,113,234.

(51) Int. Cl.
F16B 37/12 (2006.01)
(52) U.S. Cl. ...................................... 411/251
(58) Field of Classification Search .................. 411/246, 411/247, 250–252, 254, 255
See application file for complete search history.

(56) References Cited

U.S. PATENT DOCUMENTS

| 900,589 | A | * | 10/1908 | Ratcliffe | 411/262 |
|---|---|---|---|---|---|
| 988,911 | A | * | 4/1911 | Terry | 411/252 |
| 1,081,965 | A | * | 12/1913 | Kester | 411/252 |
| 1,179,446 | A | * | 4/1916 | Mennie | 411/198 |
| 1,267,656 | A | * | 5/1918 | Goserud | 411/252 |
| 1,440,324 | A | | 12/1922 | Whitaker | |
| 1,630,958 | A | * | 5/1927 | Mauch | 411/252 |
| 2,233,889 | A | * | 3/1941 | Hood | 411/251 |
| 2,562,621 | A | * | 7/1951 | Larson | 411/252 |
| 2,587,560 | A | | 2/1952 | Widmer | |
| 3,391,720 | A | | 7/1968 | Morse | |
| 3,565,149 | A | | 2/1971 | Wetzel | |
| 3,589,423 | A | * | 6/1971 | Metz | 411/262 |
| 3,701,372 | A | | 10/1972 | Breed | |
| 4,069,855 | A | | 1/1978 | Petroshanoff | |
| 4,983,085 | A | | 1/1991 | Gray | |
| 5,449,259 | A | * | 9/1995 | Clohessey | 411/262 |
| 5,529,348 | A | | 6/1996 | Wasserman et al. | |

(Continued)

FOREIGN PATENT DOCUMENTS

AT 375452 8/1984

(Continued)

OTHER PUBLICATIONS

PCT Notification of Transmittal of the International Search Report and the Written Opinion of the International Searching Authority, or the Declaration; International Search Report; Written Opinion of the International Searching Authority, dated Dec. 19, 2008.

(Continued)

Primary Examiner — Flemming Saether
(74) Attorney, Agent, or Firm — Warner Norcross & Judd LLP

(57) ABSTRACT

A locking threaded connection (a) providing free relative rotation in a first direction, (b) preventing unintended relative rotation in a second opposite direction, and (c) enabling intended relative rotation in the second direction. The connection includes male and female threaded portions and a helical spring therebetween. The spring is sized and configured to interfit with the male and female threads. The spring enables relative rotation in the first direction, but prevents relative rotation in the second direction. If removability is desired, the spring is provided with an accessible tang, enabling the locking force of the spring to be released.

9 Claims, 16 Drawing Sheets

U.S. PATENT DOCUMENTS 6,015,251 A * 1/2000 Chung .......................... 411/252

FOREIGN PATENT DOCUMENTS

| EP | 1760334 | 3/2007 |
|---|---|---|
| FR | 1377030 | 10/1964 |
| FR | 2544030 | 10/1984 |
| GB | 221456 | 9/1924 |

OTHER PUBLICATIONS

English translation of Austrian Patent 375,452 to Schleicher.

English translation of French Patent Application 2,544,030 to Gresz et al.

PCT Notification of Transmittal of the International Search Report and the Written Opinion of the International Searching Authority, or the Declaration; International Search Report; Written Opinion of the International Searching Authority, dated May 31, 2010 in PCT Application No. PCT/US2010/026196.

United States Statutory Invention Registration No. H1588, published Sep. 3, 1996, entitled "Helical Spring Fastener".

International Search Report and Written Opinion for International Application No. PCT/US2011/049254, mailed Oct. 28, 2011.

* cited by examiner

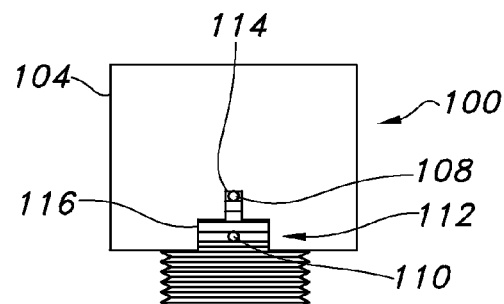
FIG. 14
FIG. 15
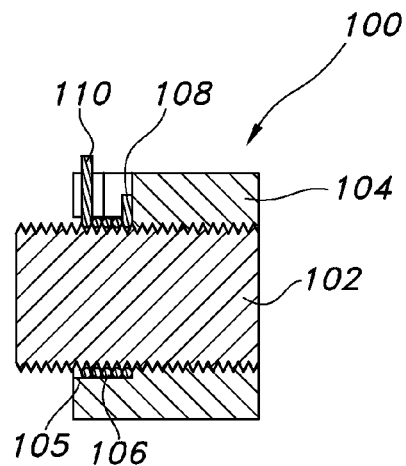
FIG. 16
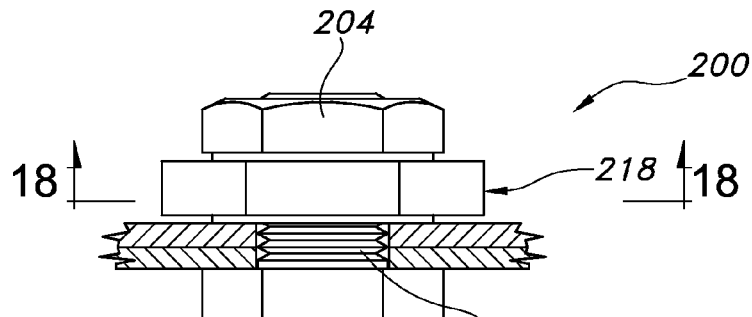
FIG. 17
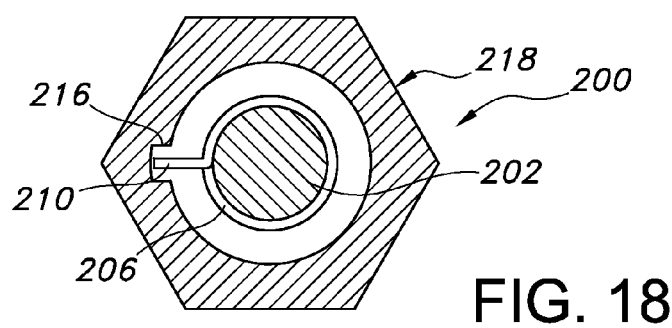
FIG. 18

LOCKING THREADED CONNECTION

BACKGROUND OF THE INVENTION

This application is a continuation-in-part of application Ser. No. 11/872,163 filed Oct. 15, 2007 and entitled "Stem-Mounted Tire Inflation Pressure Regulator" (the disclosure of which is incorporated by reference).

The present invention relates to threaded connections, and more particularly to locking threaded connections that prohibit or reduce unintended relative rotational movement in at least one direction.

Threaded fasteners and connections are well known and widely used in manufacturing and other applications. Typically, a male portion of the fastener is externally threaded, and a female portion of the fastener is internally threaded. The two portions threadedly interfit, and relative rotational movement results in relative axial movement of at least one of the portions. The axial movement typically is associated with tightening and loosening the fastener.

One issue associated with threaded fasteners and connections is unintended and undesired relative movement, for example resulting in loosening of the fastener. Consequently, a variety of fastener modifications have been developed for preventing or reducing such movement. These include without limitation cotter pins, lock washers, and friction-creating materials, such as Nylon. Another technique is the physical deformation of one or both portions of the threaded connection. Unfortunately, there are various problems with each of these modifications. Cotter pins add cost and complexity and are inappropriate for most threaded applications. Lock washers have been proven to be ineffective in applications where there is vibration. Locking patches and distorted threads introduce prevailing torque during both installation and removal. This can slow assembly and disassembly, and the prevailing torque reduces the torque transmitted to the bolt. Since prevailing torque varies with the number of times the fastener is reused, and often with temperature, a lower maximum torque must be specified with prevailing torque locking fasteners to prevent the bolt from being overstressed.

SUMMARY OF THE INVENTION

The aforementioned problems are overcome in the present invention in which a threaded connection permits ready relative rotation in a first direction, but prevents unintended relative rotation in the second opposite direction.

More specifically, the fastener includes a helical or coil spring fitted between the male and female portions of the threaded connection. The pitch of the coil spring corresponds to the pitch of the threaded fasteners. The coil spring permits relative rotation in a first (e.g. tightening) direction. However, the coil spring prevents unintended relative movement in a second (e.g. loosening) direction. The coil spring can be actuated to release the holding force, and thereby permit intended movement in the second direction. As disclosed, the spring includes a tang extending from one end of the spring that can be engaged and moved when necessary to release the tension on the coil spring permitting the fastener to be intentionally moved in the second direction (e.g. loosened).

The present invention provides a simple, highly effective, relatively low-cost threaded fastener that cannot become unintentionally loosened. The coil spring prevents essentially all undesired relative movement in the loosening direction. However, the tang on the coil spring can be easily manipulated to release the holding pressure and enable the threaded fastener to be intentionally loosened.

These and other objects, advantages, and features of the invention will be more full understood and appreciated by reference to the description of the current embodiments and the drawings.

BRIEF DESCRIPTION OF THE DRAWINGS

FIG. 14 is a side elevational view of a first alternative embodiment of the locking fastener;

FIG. 15 is a bottom plan view thereof;

FIG. 16 is a sectional view thereof;

FIG. 17 is a side elevational view of a second alternative embodiment of the locking fastener;

FIG. 18 is a sectional view taken along Line 18-18 in FIG. 17;

DESCRIPTION OF THE CURRENT EMBODIMENTS

The locking threaded connection of the present invention has a wide variety of applications—both currently known and to be developed. Several of those applications are illustrated and described in this application. The first of those applications is the stem-mounted tire inflation pressure regulator disclosed in the parent application.

Stem-Mounted Tire Inflation Pressure Regulator Embodiment

Figure 7:
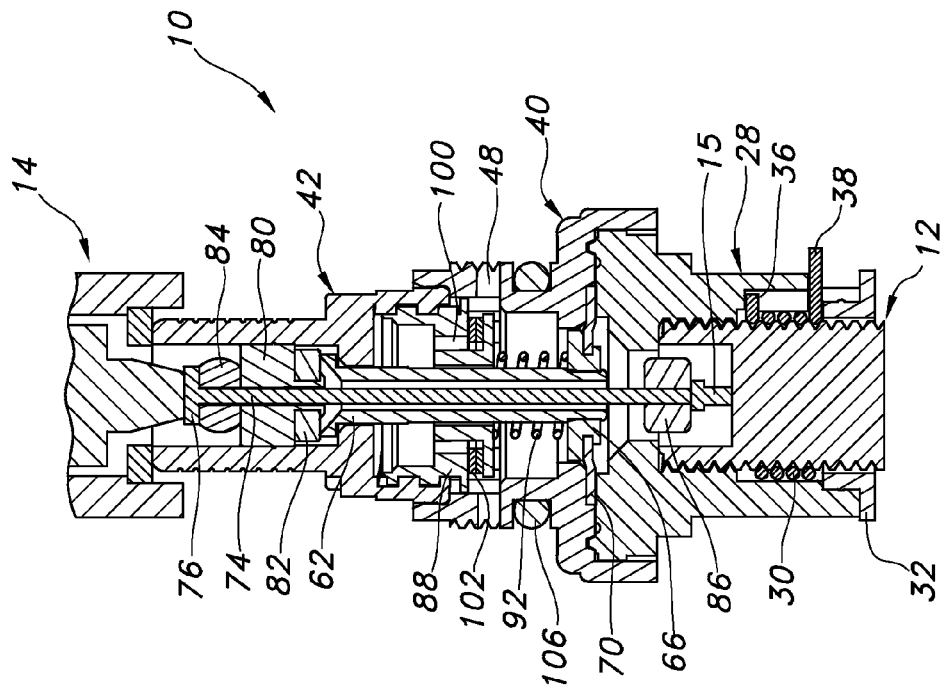
FIG. 7 is a sectional view similar to FIG. 5 showing the regulator in the "fully inflated" position.

A stem-mounted tire inflation pressure regulator constructed in accordance with the current embodiment of the invention is illustrated in the drawings and generally designated 10. As illustrated in FIGS. 1-2 and 5-7, the regulator 10 is mounted on conventional tire stem 12 of a conventional wheel. The regulator 10 receives a conventional air nozzle 14 as illustrated in FIGS. 6-7 to permit filling of the vehicle tire. A valve assembly 20 within the regulator 10 permits air to flow from the air nozzle 14 to the valve stem 12 until a preset pressure is achieved within the tire. The valve assembly 20 then snaps closed to prevent further filling of the tire beyond the present pressure. After the valve is closed, air from the nozzle 14 is diverted through an audible device to provide an audible signal to the operator.

I. Regulator

Figure 5:
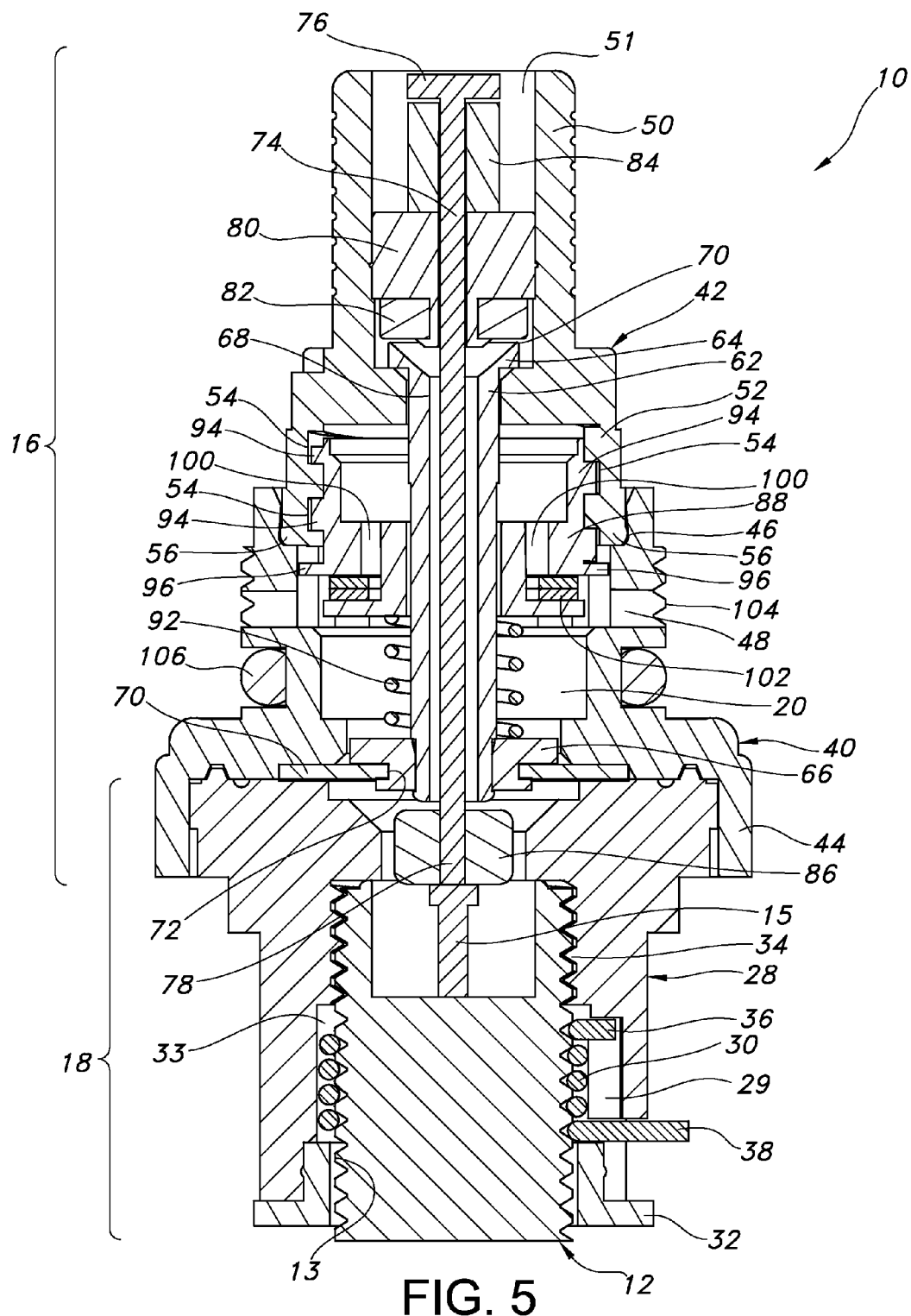
FIG. 5 is a sectional view through the regulator and the tire stem showing the regulator in the "ready" position.
Figure 6:
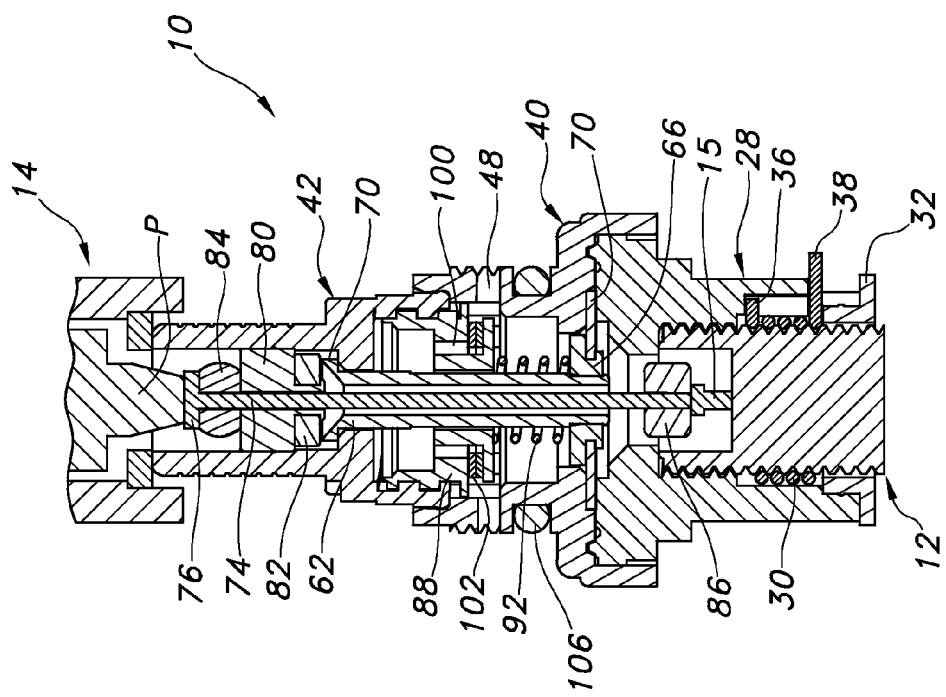
FIG. 6 is a view similar to FIG. 5 showing the regulator in the "inflating" position.
Figure 8:
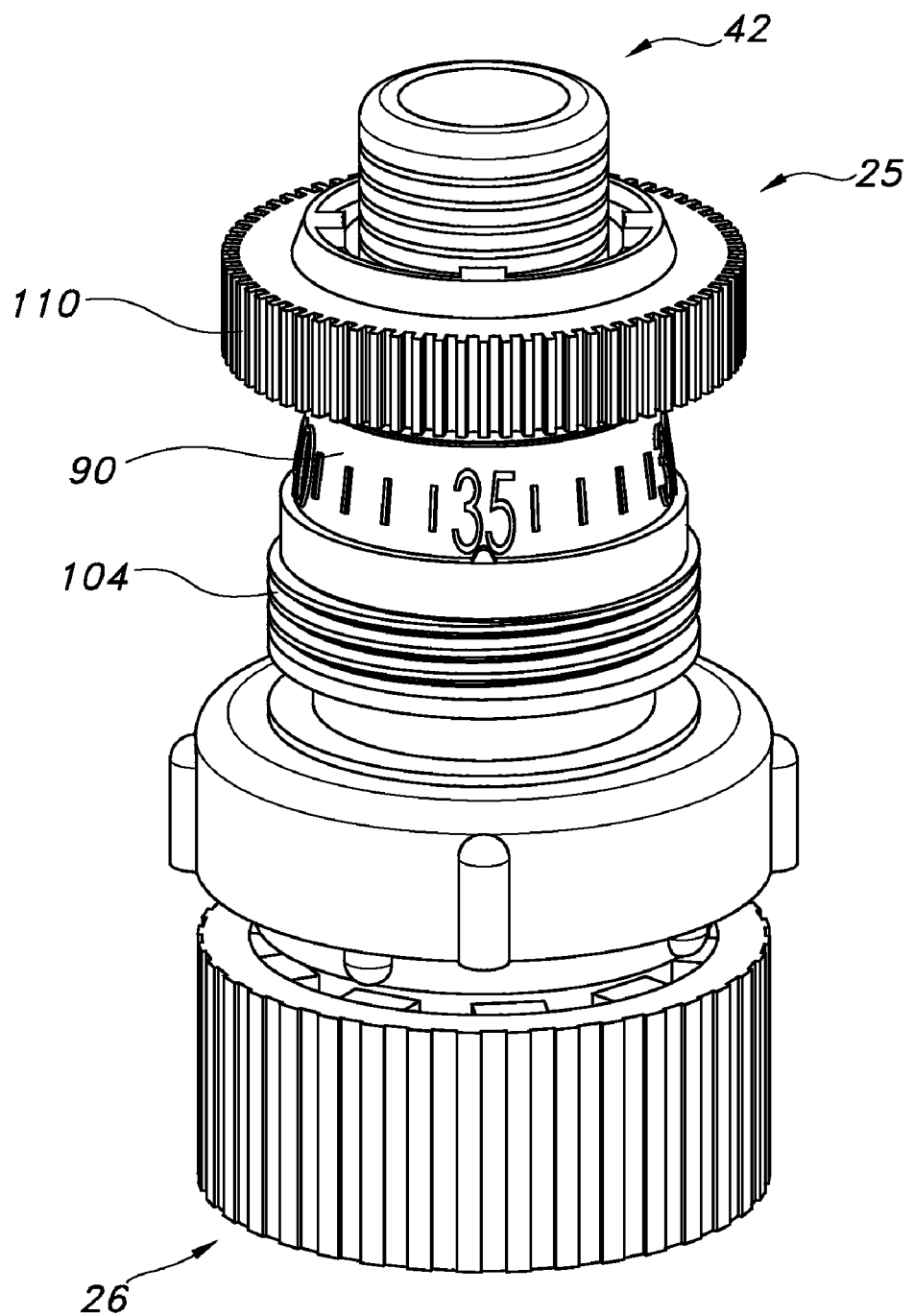
FIG. 8 is a perspective view similar to FIG. 4 and additionally showing the pressure adjustment key.
Figure 9:
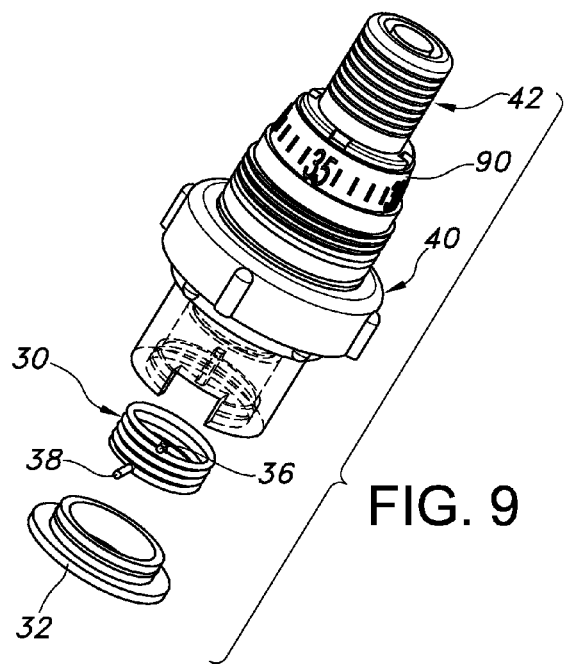
FIG. 9 is a perspective exploded view showing the thread lock mechanism.
Figure 10:
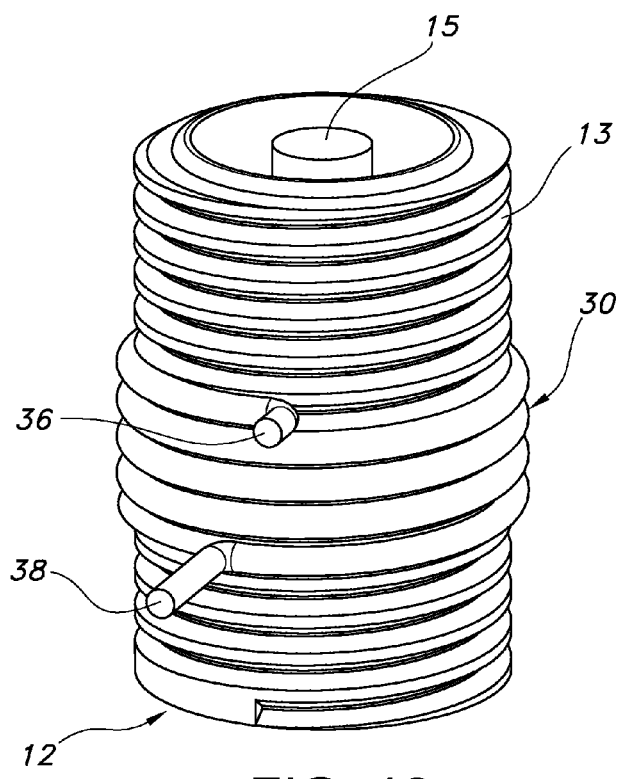
FIG. 10 is a perspective view showing the thread lock spring on a conventional tire stem.

As perhaps best illustrated in FIG. 5, the regulator 10 includes an upper assembly 16, a lower assembly 18, and a valve assembly 20. In addition to the regulator 10 itself, the regulator assembly also includes a cap 22 (FIGS. 2-3), a removal key 24 (FIGS. 3-4, 8, and 11-13), and a pressure adjustment key 24 (FIG. 8).

A. Lower Assembly

The lower assembly 18 (FIG. 5) provides a means for mounting the regulator 10 on the valve stem 12. More particularly, the lower assembly 18 includes a lower housing 28 that supports a coil spring 30 and a spring retainer 32 within an air outlet 33. The lower housing 28 may be threaded onto the valve stem 12, and the housing 28 is internally threaded at 34 to match the external threads of the valve stem. The lower housing defines an axially oriented slot for receiving the spring tang 36 as will be described.

The coil spring 30 is located below the threads 34 and includes a pitch matching the threads 34 as well as the threads of the valve stem. The spring 30 includes two tangs 36 and 38 that extend radially outwardly from the spring. The first tang 36 is closely received within the slot 29 to prevent the tang from rotating with respect to the lower housing 28. The lower tang 38 extends radially beyond the lower housing 28 so as to be accessible by the removal key (to be described). The lower tang 38 is permitted to move circumferentially to lock and unlock the regulator 10 as will be described.

The spring retainer 32 is fitted in the lower end of the lower housing 28 to retain the spring 30 in position. The lower housing 28 and the spring retainer 32 both are fabricated of plastic. Any suitable attachment technique or means may be used to intersecure the two pieces. Suitable means includes snap-fit, press-fit, screw-fit, bayonet-fit, and adhesive.

The tire stem 12 is of conventional design and includes an externally threaded portion 13 and a Schrader valve having a pin 15 (FIGS. 5-6). When the pin 15 is depressed, the Schrader valve opens and air may flow into or out of the tire through the stem 12. When the pin 15 is released, the Schrader valve closes, and air can no longer flow into or out of the tire.

B. Upper Assembly

The upper assembly 16 (FIG. 5) includes a base 40 and a top 42. The base 40 includes a skirt 44 fitted over and around the housing 28. The base 40 is fabricated of plastic and may be secured to the lower housing 28 in any suitable fashion. The upper portion of the base 40 defines an annular groove 46 for receiving the top 42 as will be described. The base 40 also defines a plurality of radially oriented vents 48 extending between the interior of the base and the exterior.

The top 42 is a single piece of plastic adapted to receive a conventional air nozzle (see FIGS. 6-7). More specifically, the top 42 includes an air nozzle receiver portion 50 defining an air inlet 51 and a regulator portion 52. The regulator portion 52 includes an internally threaded groove 54 for receiving the regulator shoe as will be described. An annular ridge 56 fitted within the annular groove 46 of the base 40. The top 42 is free to rotate within the base 40.

The indicator ring 90 (FIGS. 4, 8, and 11-12) is keyed to and rotates with the top 42. A visible scale is provided on the outside of the calibration ring 90 providing an indication of the preset pressure selected by rotating the top 42.

C. Valve Assembly

The valve assembly 20 is supported within the upper assembly 16 and more specifically within the base 40 and the top 42.

The assembly 20 includes a resiliently deformable diaphragm 70 whose peripheral portion is secured between the lower housing 28 and the base 40. The diaphragm is washer-shaped. A spring retainer 66 is mounted within the diaphragm 70. The spring retainer 66 includes an internal groove 72 which receives the interior diameter of the diaphragm 70.

The valve assembly 20 further includes a guide 62 supported at one end by its shoulder 64 and at its opposite end by the spring retainer 66. The guide 62 includes an internal guide bore 68 through which air may flow into the tire as will be described. The upper portion of the shoulder 64 terminates in a relatively narrow circumferential edge 70.

The valve assembly 20 also includes an actuator pin 74 having an upper end 76 and a lower end 78. The upper end 76 is pad-shaped and is adapted for engagement by the pin in the air nozzle 14. The actuator pin 74 is aligned with the Schrader valve pin 15 in the tire stem. Consequently, depression or actuation of the actuator pin 76 causes depression or actuation of the Schrader pin 15.

The valve assembly 20 (FIG. 5) further includes a sleeve 80 fitted within the top 42 and supporting the actuator pin 74. A compressible seal 82 is mounted on the lower end of the sleeve 80 in an annular groove. Another compressible seal 84 is mounted about the upper end of the actuator pin 74 between the pad 76 and the sleeve 80. A guide button 86 is carried by the lower end 78 of the actuator pin 74. The sleeve 80 and the guide button 86 are plastic, and each of the compressible seals is fabricated of any suitable resiliently compressible material.

A controllable spring force can be applied to the guide 62 by way of a regulator assembly including a regulator shoe 88, a calibration ring 90 (see FIG. 4), and a coil spring 92. The coil spring 92 is compressed between the regulator shoe 88 and the spring retainer 66. Thus, the regulator shoe 88 also serves as a spring retainer. The regulator 88 includes an external thread 94 which rides within the groove 54 in the top 42. Fingers 96 on the shoe 88 ride axially within the base 40 to prevent relative rotation of the two components. Consequently, rotation of the top 42 results in axial movement or adjustment of the shoe 88. Using a left-hand thread, greater spring force can be applied by rotating the top 42 in a clockwise direction (as viewed from the top of the regulator) and the spring force can be reduced by counterclockwise rotation of the top 42. A right-hand thread can be used, if desired, to provide an increase in spring force with counterclockwise rotation.

The shoe 88 includes vent ports 100. Conventional acoustic disks 102 are aligned with the vent ports 100. Consequently, air passing through the vent ports 100 also passes through the acoustic disks 102 causing them to provide an audible signal. The air then passes through the vent ports 48 in the base 40.

II. Regulator Cap

Figure 1:
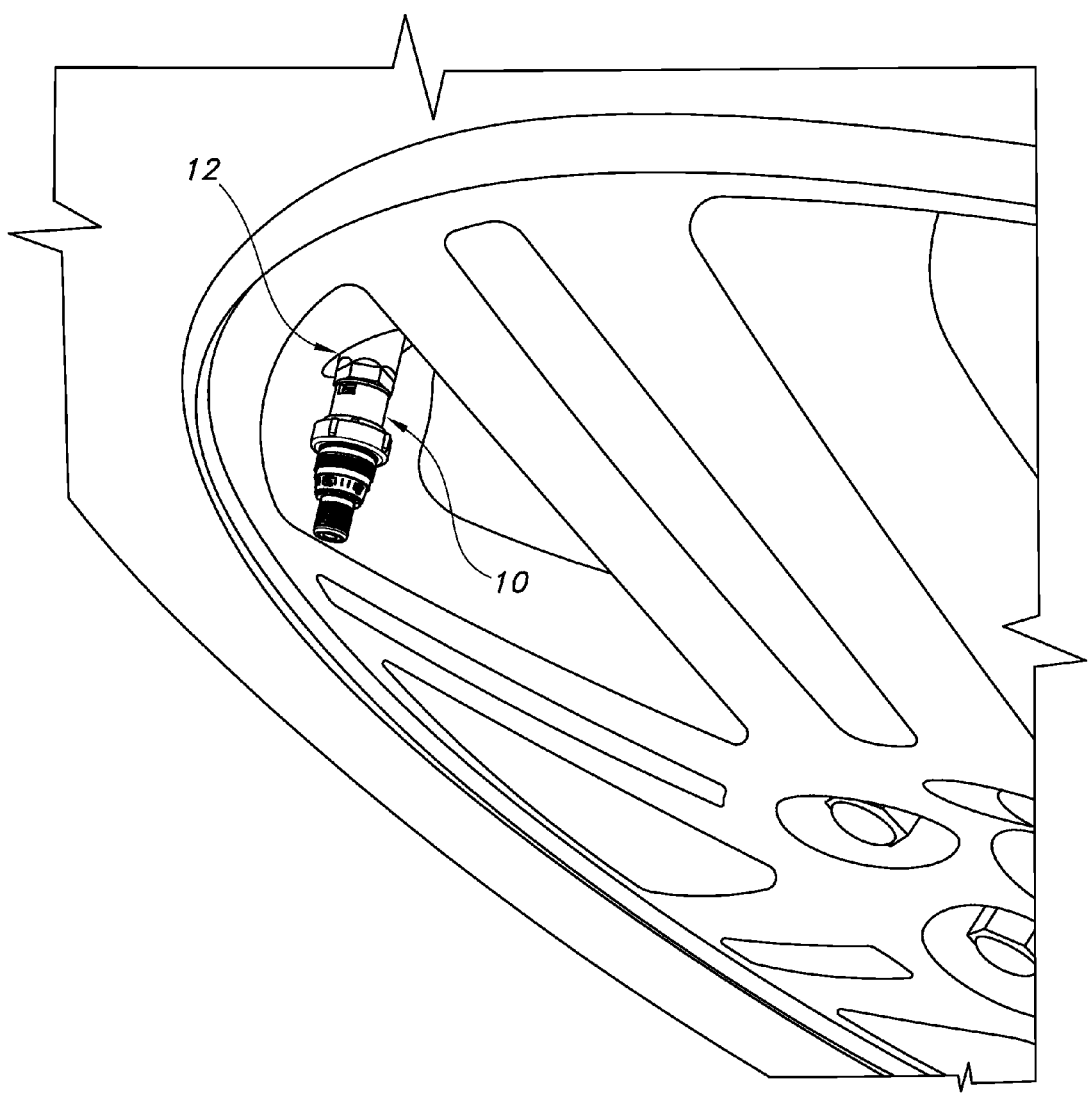
FIG. 1 is a perspective view of the stem-mounted pressure inflation regulator (without the cap) mounted on a conventional tire valve stem.
Figure 2:
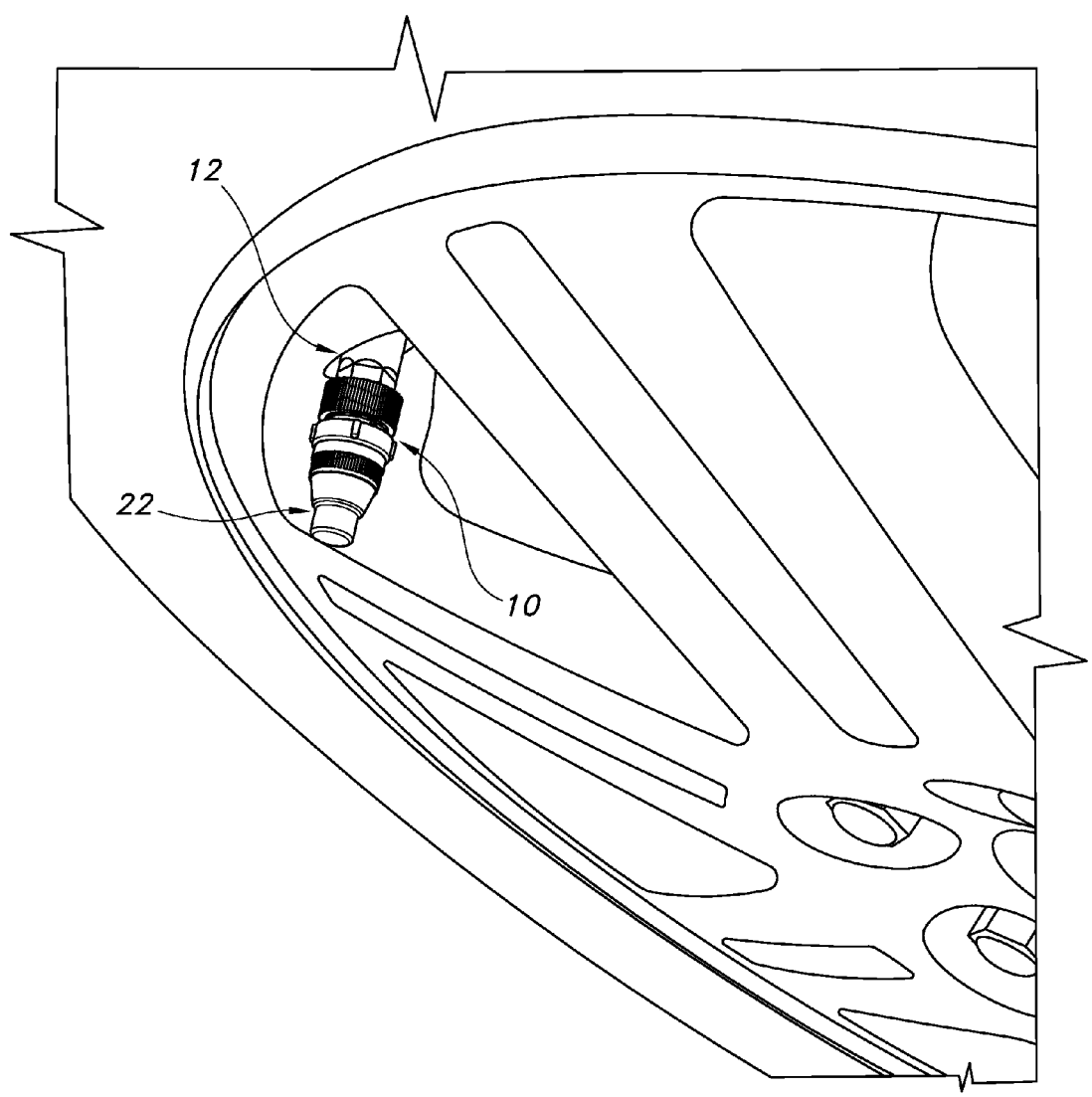
FIG. 2 is a perspective view similar to FIG. 1 but with the cap and the removal key installed on the regulator.
Figure 3:
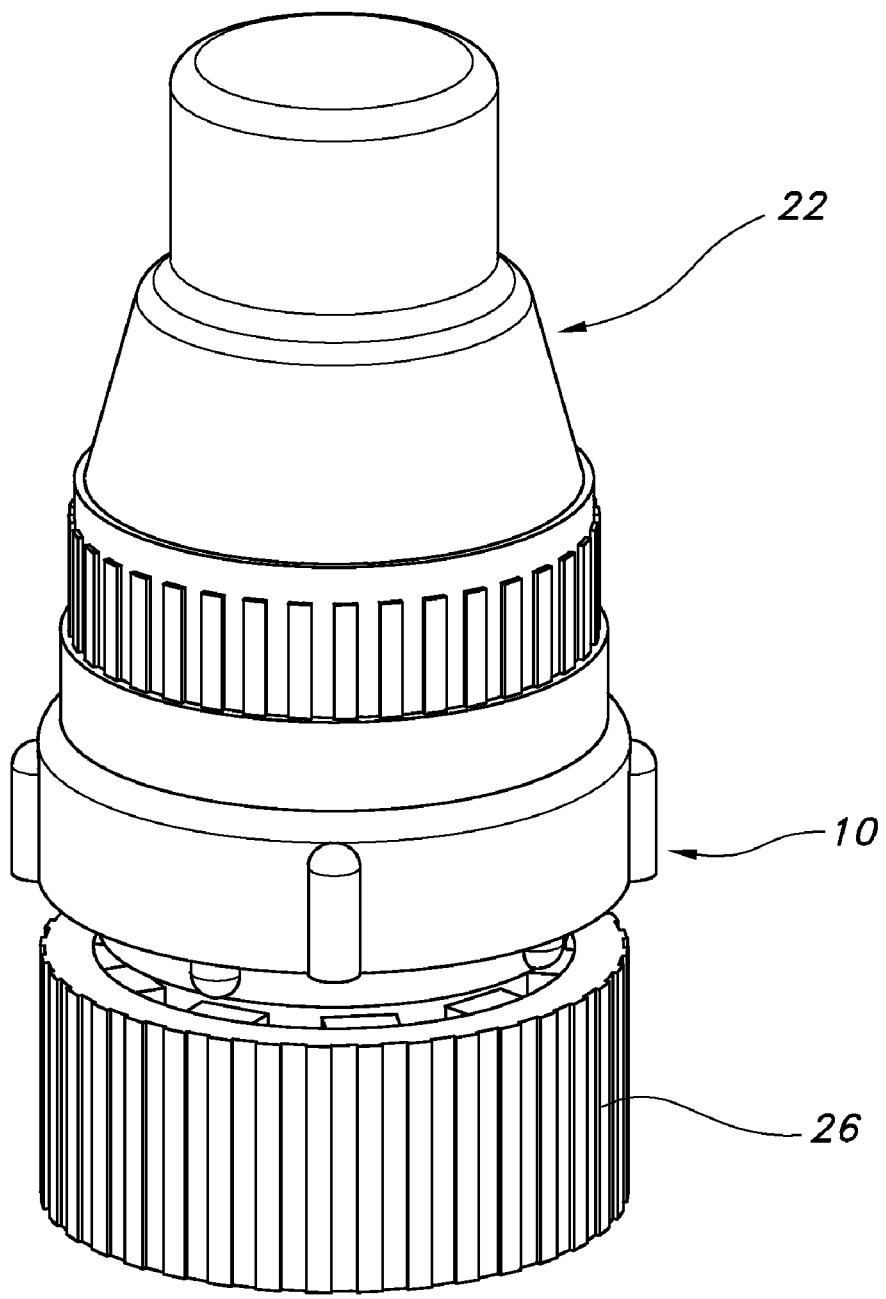
FIG. 3 is a perspective view of the pressure regulator with both the cap and the removal key installed.
Figure 4:
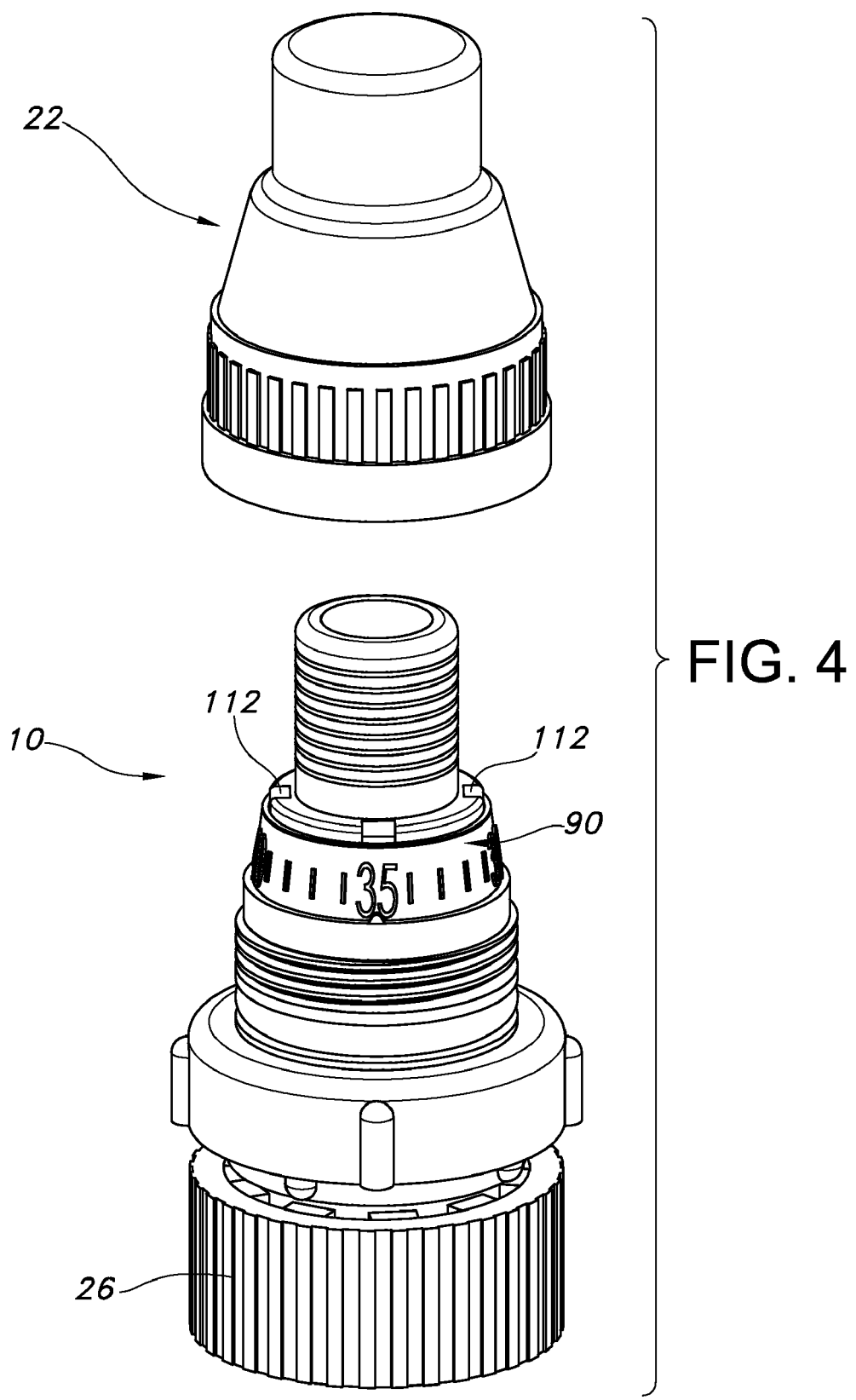
FIG. 4 is a perspective view similar to FIG. 3 but with the cap removed.

The base 40 is externally threaded at its upper portion 104 to receive the cap 22 (see FIG. 3). An O-ring 106 provides an air-tight seal between the cap 22 and the regulator 10. Because both the air inlet 51 and the vent ports 48 are located under the cap 22 when the cap is installed, the cap prevents inadvertent or unwanted escape of air through the regulator 10 in case of failure or leakage of the Schrader valve within the stem 12.

III. Pressure Preset Key

The key 25 for rotating the top 42 is illustrated in FIG. 8. The key 25 includes a knurled exterior surface 110 and a plurality of protrusions (not visible) that interfit with the notches 112 (FIG. 4) in the top 42. The key is readily fitted over and readily removed from the top 42. Consequently, the top 42 may be easily manually rotated using the key 25, enabling the preset maximum pressure to be simply and easily adjusted. The key typically would be used only by the installer of the regulator 10.

IV. Regulator Removal Key

The coil spring 30 has approximately the same diameter of the tire stem 12. The friction between the stem 12 and the coil spring 30 tends to "open" the spring or expand it somewhat radially as the spring is turned onto the stem 12. Consequently, the coil spring 30 can be freely rotated onto the tire stem as the regulator 10 is turned or screwed onto the tire. However, the spring 30 prevents rotation in the "unscrewing" or removal direction. Because the upper tang 36 is held against rotation with respect to the lower housing 28, the spring 30 tightens around the tire stem 12 due to the friction therebetween. So, the spring 30 prevents relative rotation between the regulator 10 and the tire stem 12 in the removal direction.

The removal key 26 (FIGS. 3-4, 8, and 11-13) is required to remove the regulator 10 from the tire stem 12. The key 26 is generally a circular arc extending approximately 270 degrees thereby defining a mouth 120 capable of fitting over the lower housing 28. The interior wall of the key 26 includes a plurality of ribs 122 which in turn define grooves 124 therebetween. When the key is fitted over the regulator 10, the lower spring tang 38 extends into one of the grooves 124. The outer surface 126 of the key 26 is knurled to facilitate manual operation. Upon such rotation of the installed key 26, the tang 38 moves in a direction which loosens the spring 30 and enables the regulator 10 to be unscrewed from the tire stem. As with the pressure preset key 25, the removal key 26 typically is used only by an installer.

V. Operation

The first step in installing a regulator 10 on the valve stem 12 of a vehicle tire is to preset the desired maximum inflation pressure. This is done by placing the pressure preset key 25 (FIG. 8) over the top 42 and rotating the top until the desired pressure is indicated on the calibration ring 90. The maximum pressure typically will be the vehicle manufacturer's recommended cold tire pressure. After the maximum pressure has been preset or selected, the calibration key 25 is removed from the regulator 10.

The regulator 10 is then rotated or screwed onto the tire stem 12. As the regulator 10 is screwed onto the tire stem 12, the spring 30 first engages the threads 13 on the tire stem and ultimately the threaded portion 34 of the lower housing 28 also engages the threads of the tire stem. Because the spring 30 wants to "open" during rotation, the regulator 10 can be easily rotated onto the tire stem 12 manually without the use of any tools or keys. When the regulator 10 has seated on the valve stem 12, the regulator is ready for use. The regulator 10 is tamper proof after installation on the valve stem.

FIG. 5 illustrates the regulator 10 in the "ready" position, which is the normal or at-rest position without an air nozzle connected. The compressible seal 84 at the top of the stem provides an upward force on the actuator pin 74. Consequently, both the actuator pin 74 and the Schrader pin 15 in the tire stem 12 are in their relaxed or upper positions.

FIG. 6 illustrates the regulator 10 in the "inflating" position in which the conventional air nozzle 14 is placed over the top 42 of the regulator 10. When the nozzle is so positioned, the air nozzle pin P depresses the actuator pin 74 against the compression seal 84, so that the actuator pin depresses the Schrader pin 15 in the tire stem 12. When the air nozzle 14 is actuated, air flows from the air nozzle to the tire stem 12 along the following path: first, through the air inlet 51 and past the compression seal 84, second between the top 42 and the sleeve 80, third past the compression seal 82 and the top 42, fourth between the compression seal 82 and the edge 70 of the guide 62, fifth between the guide 62 and the actuator pin 74, sixth through the lower housing 28 past the guide button 86 and into the air outlet 33. The regulator 10 remains in the "inflating" position until the preset maximum pressure is reached at the valve stem 12.

The "fully inflated" position of the regulator 10 is illustrated in FIG. 7. Specifically, the valve assembly 20 moves to this position when the maximum pressure is reached, thereby preventing further air from flowing into the tire stem 12. When the pressure at the tire stem 12 reaches the maximum pre-selected pressure, that pressure against the diaphragm 70 and the spring retainer 66 overcomes the spring force of the spring 92. Consequently, the diaphragm and spring move upwardly in a rapid snap action. The valve assembly is unstable between the two positions illustrated in FIGS. 6-7. The movement of the diaphragm 70 and the spring retainer 66 moves the guide 62 upwardly within the regulator 10 until the upper edge 70 of the guide seats against the compressible seal 82. The engagement of the guide with the compressible seal prevents further air from flowing into the tire stem 12. In this position or configuration, air flows from the air hose 14 to the vent ports 48 along the following path: first through the air inlet 51 and past the compression seal 84, second between the sleeve 80 and the top 42, third between the compression seal 82 and the top 22, third between the guide 62 and the top 42, fourth through the vent ports 100, fifth past the acoustic disks 102, and sixth through the vent ports 48. The air flowing through the acoustic disks creates an audible alert signaling that the tire has achieved the pre-selected pressure. At this point, the operator removes the air nozzle 14 from the regulator 10; and the actuator pin 74 and the Schrader pin 15 return upwardly to the ready position illustrated in FIG. 5.

The valve assembly 20 has two positions and is stable only in the two positions. The valve assembly moves rapidly between the two positions in a "snap action" that does not permit the valve to remain in any position between the two positions. Consequently, the device responds rapidly to achievement of the maximum air pressure and thereafter terminates air flow into the tire and instead directs the flow promptly through the acoustic generator.

Following inflation, the cap 22 is installed by screwing the cap onto the threads 104 so that the cap seals against the O-ring 106. At this point, the regulator assembly appears as in FIGS. 2-3.

When the tires are to be "topped off" or otherwise returned to full inflation, the cap 22 is removed from the regulator by unscrewing. The rotational lock provided by the coil spring 30 prevents the regulator 10 from rotating when the cap is removed. Consequently, the regulator 10 can not be removed inadvertently with unscrewing of the cap 22.

Figures 11, 12:
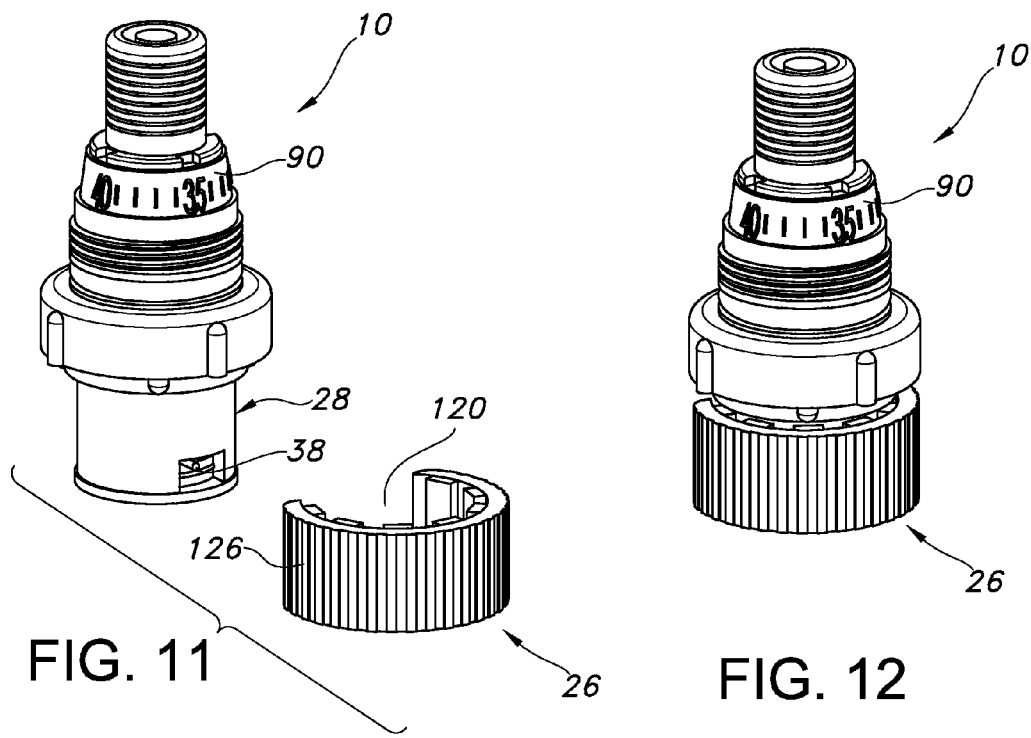
FIG. 11 is a perspective view similar to FIG. 4 showing the removal key separated from the regulator.
FIG. 12 is a perspective view similar to FIG. 11 showing the removal key installed on the regulator.
Figure 13:
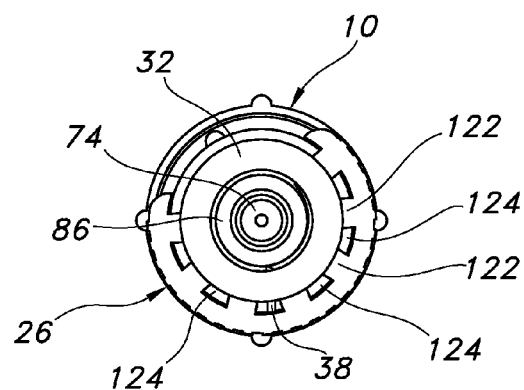
FIG. 13 is a bottom plan view of the regulator and key.

When the regulator 10 is to be removed from the stem 12, the corner key 26 is positioned on the regulator 10 as illustrated in FIGS. 3 and 12-13 so that the tang 38 is captured in one of the grooves 124. Rotational motion of the key 26 will first move the tang 38 to release the locking pressure, and continued movement rotates the regulator 10. With the spring 30 pressure released, the regulator 10 may be unscrewed manually without the need for tools or other assistance.

The regulator 10 has a relatively low mass, at least with the context of a wheel. Consequently, the regulator does not create tire imbalance, clearance problems, or excessive stem flexure at high speeds.

The regulator 10 does not interfere with or override the operation of the Schrader valve within the tire stem 12. In the ready position, the regulator allows the Schrader valve to close normally. When inflating the tire, the regulator 10 opens the Schrader valve to allow air into the tire. Removal of the air supply enables the Schrader valve to close to its normal position, ready for the next inflation cycle.

With the regulator 10 in place, normal tire maintenance should not require a pressure gauge, because the regulator includes a calibrated scale and acts automatically to maintain tires at the set point. However, the capability to use a pressure gauge is maintained. If tire pressure is at or below the set point, the pressure gauge should measure tire pressure directly without loss of air from the tire. If pressure readings are required on a tire with pressure above the set point (e.g. warm tire), the operator can remove the regulator 10 and connect the gauge directly to the tire valve stem 12.

Further as disclosed, the regulator does not interfere with or override the operation of the Schrader valve. When not in use inflating the tire, the device allows the Schrader valve to close normally. When inflating the tire, the device opens the Schrader valve to allow air into the tire and subsequently cut off flow of air into the tire at the preset pressure point. Removal of the air supply nozzle from the regulator allows the Schrader valve to close and reset to a normal position, ready for the next inflation cycle.

Additional Locking Threaded Connection Embodiments

As an initial issue, it is pointed out that helical springs have been used to rotationally lock axially aligned shafts in a construction known as "a wrap-spring clutch." Such a clutch includes two smooth surface, coaxial shafts butted together and a helical or coil spring wrapped around a portion of both shafts. One end of the spring is anchored to the drive shaft. When the drive shaft rotates in one direction, the spring coil tightens, transmitting torque from the drive shaft to the driven shaft to rotate the driven shaft at the same speed and in the same direction. When the drive shaft stops rotating, the driven shaft can overrun or freewheel within the spring because the spring coils loosen their grip, allowing the driven shaft to continue to rotate independently of the drive shaft. The clutch also provides a ratchet-type action in which the drive shaft will rotate the driven shaft in one direction only. Upon reversal in direction of the drive shaft, the driven shaft is not driven and remains stationary. In a refinement of the clutch, the spring may be independently controlled to tighten and loosen the spring about the driven shaft.

I. Locking Threaded Connection First Alternative Embodiment

FIGS. 14-16 illustrate a first alternative embodiment 100 of the locking fastener (i.e. a first alternative to the pressure regulator described above). The fastener 100 includes a threaded male portion 102, a threaded female portion 104, and a coil spring 106 therebetween. The coil spring is also known as a helical spring or a wrap spring. The male and female threads may be of any thread form, pitch, and diameter known to those skilled in the art.

The female threaded member 104 defines a counter-bored portion 105 having a depth equal to or greater than the length of the spring 106. Preferably, the inner diameter of the counter-bored portion is sized to allow the spring 106 to fit into it with little diametrical clearance. The female threaded member additionally defines a slot 112 in the counter-bored area to receive the tang ends of the spring. The slot has a narrow width area 114 and a large width area 116. The narrow width portion 114 is just wide enough to receive a spring tang, and the wider slot portion 116 is substantially larger than the diameter of the spring wire.

The coil or helical spring 106 is a tightly wound extension type, which is wound in the same direction as the male and female threads of the members 102 and 104. The spring 106 is formed from wire diameter that is smaller than the pitch of the threads so that the wire can nest in the space between adjacent male threads. Preferably, the outside diameter of the spring coil 106 is slightly larger than the outside diameter of the male portion 102. In the current embodiment, the spring is wound on a mandrel slightly smaller than the male thread pitch diameter. This enables the male thread to screw into the spring, slightly expanding the spring so that the spring grips the thread.

The spring 106 includes a pair of tangs 108 and 110 on opposite ends of the coil. The tangs are illustrated as bent at 90 degrees to the axis of the spring, but other orientations are possible. The spring normally is formed with several turns, and the number of turns for any specific application will depend on the desired characteristics of the locking member in that application.

The first tang 108 is received in the narrow slot portion 114, and the second tang 110 is received in the wide slot portion 116. The first tang 108 is just long enough to project into the slot, but preferably is shorter than the wall thickness of the female member 104 so that the tang does not project beyond the outside surface of the female member. The second tang 110 is sufficiently long to project beyond the outside surface of the female member (as seen in FIGS. 15-16). In some applications, the second tang 110 will be shorter than the wall thickness of the female member. When the first tang 108 is positioned within the narrow slot portion 114, the second tang 110 lies within the wide slot portion 116 without contacting the walls of the slot.

To use the fastener 100, the spring 106 is first pushed into the counter-bored hole 105 in the female member 104 with the tangs 108 and 110 fitted within their respectively slot portions 114 and 116. As an option, a retaining member (not shown) could be pressed into the hole after the spring to retain the spring in position, particularly if the assembly is made in advance of joining the male and female members. Typically, these steps would be performed during manufacture.

When the male and female threaded members 102 and 104 are screwed together, the male thread first engages the spring 106. The torque on the spring 106 is opposed by the first tang 108, which prevents the spring from rotating. The torque is in a direction which causes the spring to expand slightly, allowing the male thread to advance into the spring coil 106. The male thread also extends the spring 106 so that the coils of the spring automatically adjust to the thread pitch. The expansion, both radially and longitudinally, of the spring, gives rise to a light friction between the spring and the male threads. As rotation continues, the male thread continues to advance through the spring 106 and into the female thread to form a secure connection. The spring 106 translates axially within the counter-bored area 105 if necessary to ensure the male and female threads engage properly.

If an unscrewing torque is applied to the fastener 100, the first tang 108 prevents the spring 106 from rotating, which acts to tighten the coil of the spring on the male member 102. The friction of the spring 106 on the male member 102 is sufficient to lock the joint together. There is no lost motion or backlash if the narrow slot portion 114 matches the diameter of the spring wire and if the diametrical clearance of the spring 106 within the counterbore 105 is minimal so that there is no bending deflection of the first tang 108.

The assembled fastener 100 can only be unscrewed by applying a force to the second tang 110, so that as unscrewing torque is applied, the force on the second tang acts to expand the spring so that the male member 102 can slip relative to the spring.

As an alternative, the second tang 110 can be omitted and/or the slot portion 116 can be limited to partial depth of the wall so that there is no external access to the spring 106. In this case, the assembly would be permanent because the second tang 110 could not be accessed to release the locking force of the spring 106.

The torque strength of the joint in the unscrewing direction is dependent on the spring wire tensile strength and shear strength. To enhance strength, the wire diameter should be as large as possible, which is close to the thread pitch, where the pitch is the space between adjacent threads. Also, the diameter of the counter-bore 105 should be a very close fit with the spring outside diameter so that the force on the first tang 108 is applied close to the bend, minimizing bending stress and deflection of the spring wire.

The fastener 100 is installed with very little prevailing torque, and prevents reverse rotation at substantially higher torque levels than prevailing torque-locking fasteners. Prevailing torque is the torque normally present in locknuts with distorted threads, plastic inserts, or threads with locking patches, which much be overcome before torque is applied to the fastened structure. Fasteners 10 installed with a torque wrench allow a direct reading of the torque being applied to the joint without compensating for the prevailing torque. This allows the fastener to be torqued to higher levels because it is not necessary to allow for variable prevailing torque. The resistance to loosening of the present fastener is relatively high, which enables the joint to withstand greater vibration and shear stresses, which act to loosen bolted joints.

II. Locking Threaded Connection Second Alternative Embodiment

A second embodiment 200 of the locking threaded connection is illustrated in FIGS. 17 and 18 and designated 200. For the second embodiment 200—and all other alternative embodiments—designating numerals whose final two digits are the same identify matching or corresponding elements. Those corresponding elements will not be re-described in conjunction with each embodiment.

The second embodiment 200 additionally includes a release ring 218 defining the slot 216. The ring 218 allows the fastener 204 to be removed without compromising the joint strength. Specifically, the release ring 218 can be partially rotated to apply a force to the second tang 210 to apply reverse torque to the fastener 200.

III. Locking Threaded Connection Third Alternative Embodiment

Tools and fixtures used in manufacturing are subject to cyclic loading, wear, and handling stress. They are also often adjusted, reconfigured, and reassembled. Before the present invention, it was necessary to use splines, keyed shafts, set-screws, or non-round shaft and socket arrangements to provide bidirectional torque capability for machine tool hand wheels, control knobs, valve handles, and the like. Small knobs are often simply threaded and do not have bi-directional torque capability, often loosening during operation and interrupting normal procedures or limiting their application. Adding a jamb nut to a threaded control knob offers some bidirectional torque improvement, but may not be acceptable in appearance or clearance.

Figure 19:
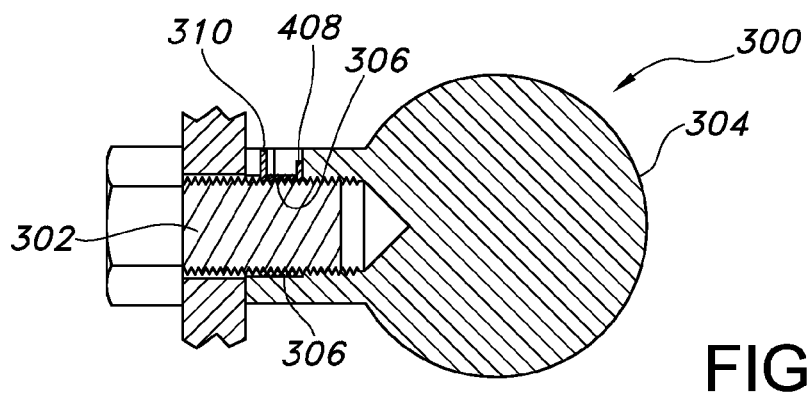
FIG. 19 is a sectional view of a third alternative embodiment of the locking connection in which a control knob is mounted on a threaded shaft.
Figure 20:
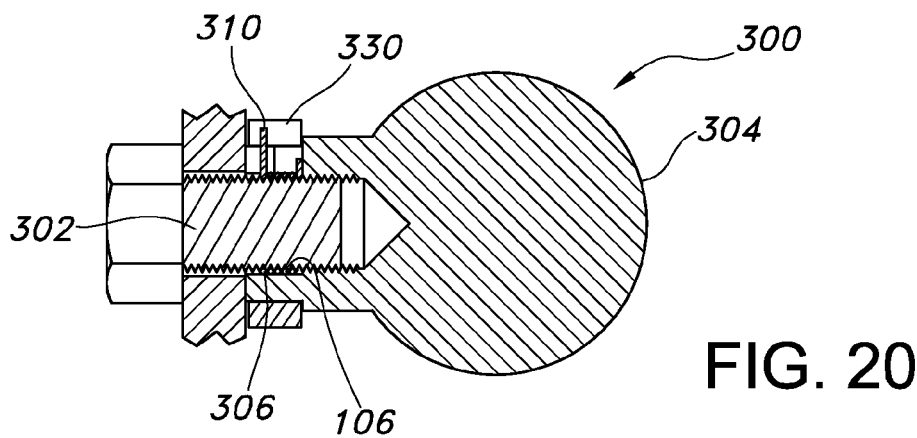
FIG. 20 is a view similar to FIG. 19 and additionally including a release ring.

FIGS. 19-20 show a third embodiment 300 of the connection in which a control knob 304 is attached to a shaft 302 using the described helical spring 306. A separate release ring 330 (FIG. 20) can be used to permit removal of the control knob 304 in a fashion akin to the pressure regulator described above. The release ring enables easy removal. Alternatively, a permanent connection can be provided by omitting the release ring capability.

As can be appreciated, the locking connection technology of the present invention is ideal for combining strong joints with easy disassembly. Additionally, unlike commonly used locknuts, the present fasteners are reusable. There is no degradation in performance after repeated on/off cycles of the fastener.

IV. Locking Threaded Connection Fourth Alternative Embodiment

Figure 21:
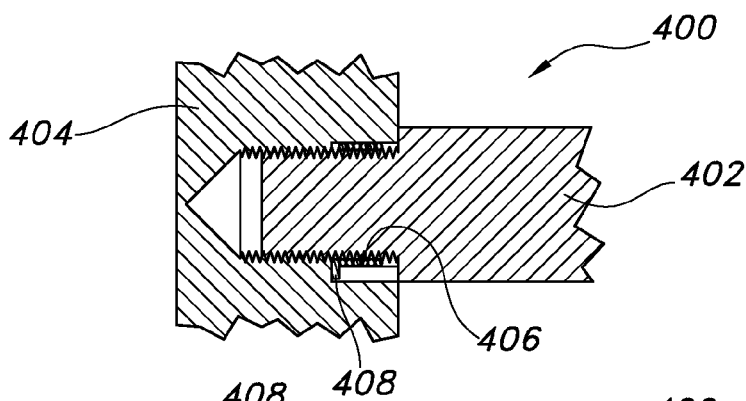
FIG. 21 is a sectional view of a fourth embodiment of the locking connection in which a stud is permanently mounted in a base.
Figure 22:
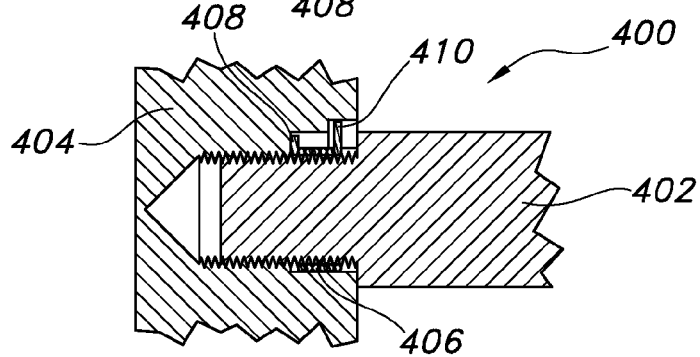
FIG. 22 is a view similar to FIG. 21 in which the stud is removably mounted in the base.

FIGS. 21-22 show two variations of a fourth alternative embodiment 400 of the invention in which a stud 402 is screwed into a base 404 using the spring 406. The variation 400 (FIG. 21) is permanent because the second tang is omitted and/or inaccessible. The variation 400' (FIG. 22) is temporary because the second tang 410 is included. Both variations provide bidirectional torque functions, and eliminate the need for cross pins, keying, notching, or other locking methods.

V. Locking Threaded Connection Fifth Alternative Embodiment

Figure 23:
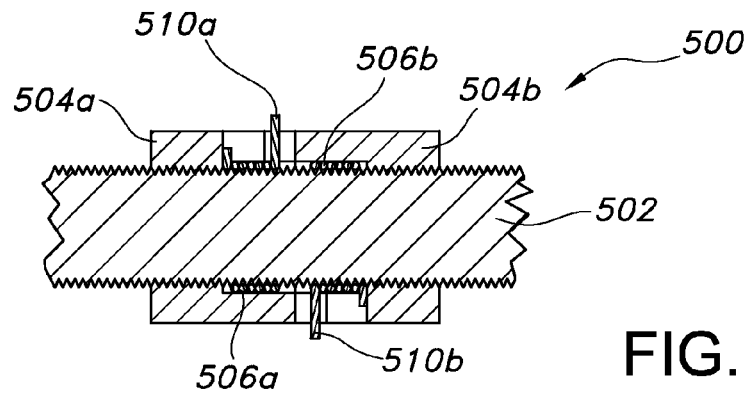
FIG. 23 is a sectional view of a fifth embodiment of the fastener in which jamb nuts abut one another.

FIG. 23 illustrates an embodiment 500 providing position locking. Unlike conventional locking fasteners, the present technology locks more securely, to the full strength of the steel wire used in the helical spring. This added strength enables the present fasteners to lock their positions extremely securely. Two jamb nuts 504a and 504b are used or installed face-to-face to create a stop position on a threaded shaft 502. Vibration and shear stresses cannot loosen the jamb nuts or change their position on the shaft.

Figure 24:
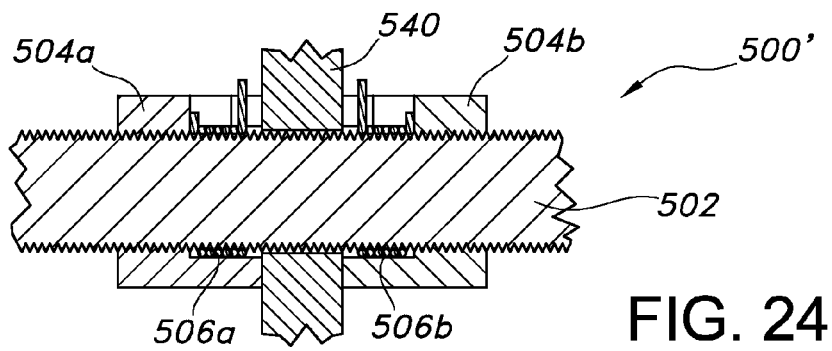
FIG. 24 is a view similar to FIG. 23 but with the jamb nuts securing an object therebetween.

FIG. 24 illustrates a variation 500' in which a component 540 is sandwiched between the jamb nuts 504a and 504b. When the component 540 is sandwiched between the two jamb nuts 504a and 504b, the position of the component on the shaft 502 is reliably fixed until at least one of the jamb nuts is intentionally loosened or removed.

Figure 25:
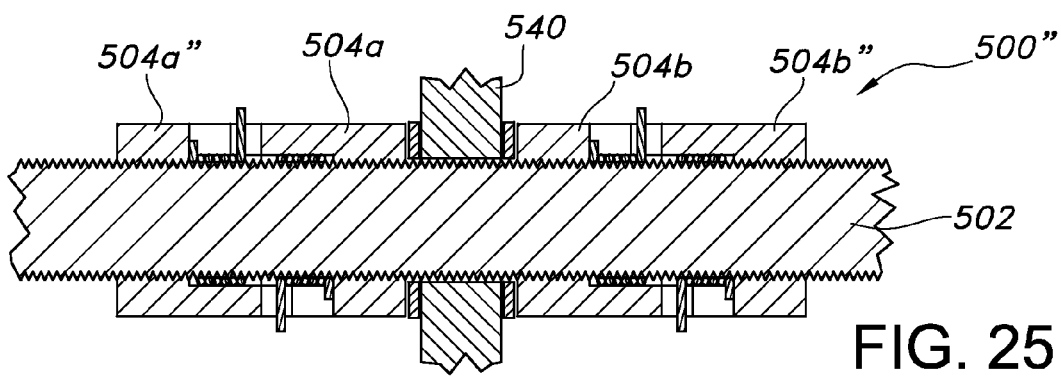
FIG. 25 is a view similar to FIG. 24 but with additional jamb nuts.

FIG. 25 illustrates a second variation 500" in which a second pair of jamb nuts 504a" and 504b" are used to even more reliably hold the component in axial position on the shaft and to apply a controlled amount of friction on the component.

VI. Locking Threaded Fastener Sixth Alternative Embodiment

Figure 26:
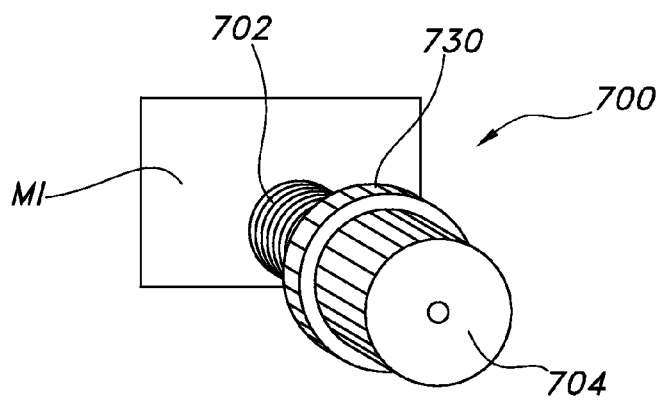
FIG. 26 is a perspective view of a sixth embodiment of the connection used to adjust a string of a stringed instrument.

FIG. 26 illustrates a tension adjuster 700, for example for a musical instrument MI, using the present technology. The adjuster 700 provides a simple way to provide both fine adjustment and lock-in-place stability for adjusting tension. Applications include string instrument tuning and many mechanical and instrumentation systems.

VII. Locking Threaded Fastener Seventh Alternative Embodiment

Figure 27:
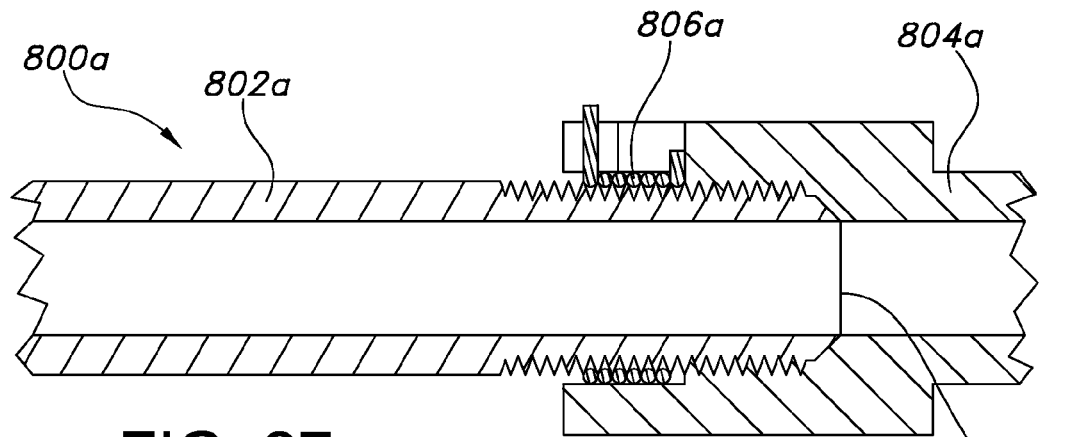
FIG. 27-29 are sectional view of fluid couplings using the technology of the present invention.
Figure 28:
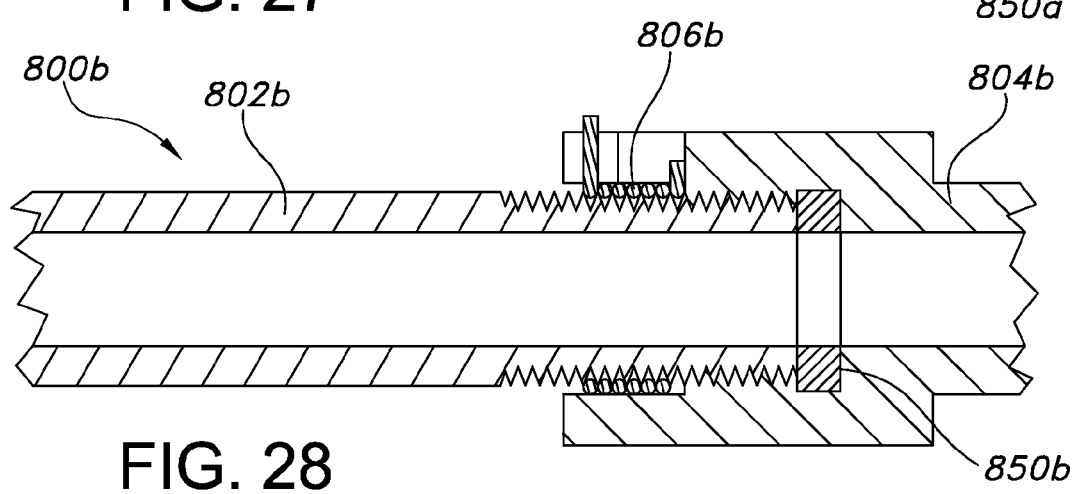
Figure 29:
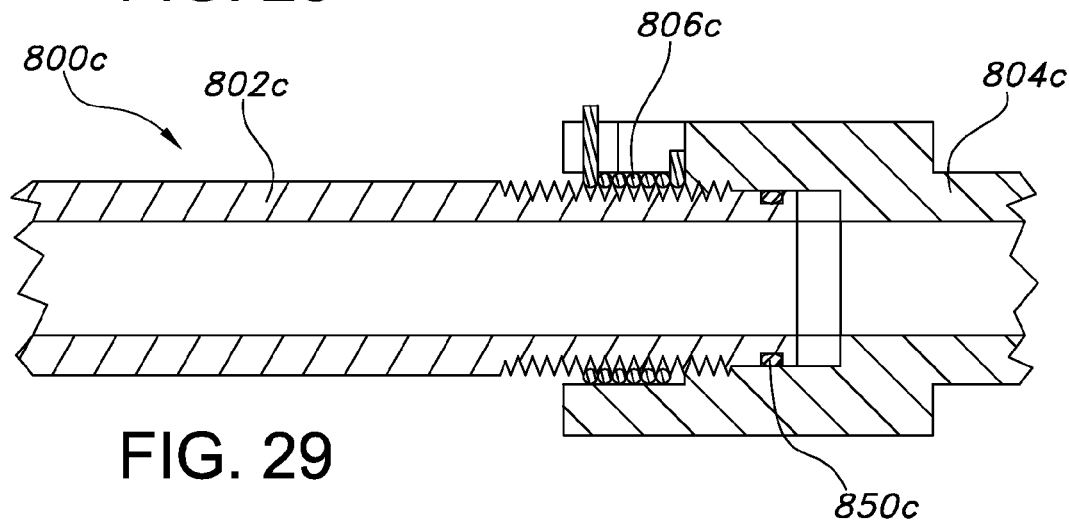

FIGS. 27-29 illustrate a variety of fluid couplings 800a, 800b, and 800c using the present technology. In each coupling, loosening and the attendant leakage are prevented. This is particularly useful where fluid couplings are inaccessible and/or subject to stress and vibration. Each coupling includes a hollow male threaded piece 802 and a hollow female threaded piece 804, which together provide a fluid path through the coupling 800. The three couplings 800a, 800b, and 800c differ only in the particular seal included. The coupling 800 (FIG. 27) includes a compression seal 850a. The coupling 800b (FIG. 28) includes a gasket 850b. And the coupling 800c (FIG. 29) includes an O-ring seal 850a.

In addition to fluids, similar couplings can also be adapted to conduits for electrical and fiber optic use.

VIII. Locking Threaded Fastener Seventh Alternative Embodiment

Figure 30:
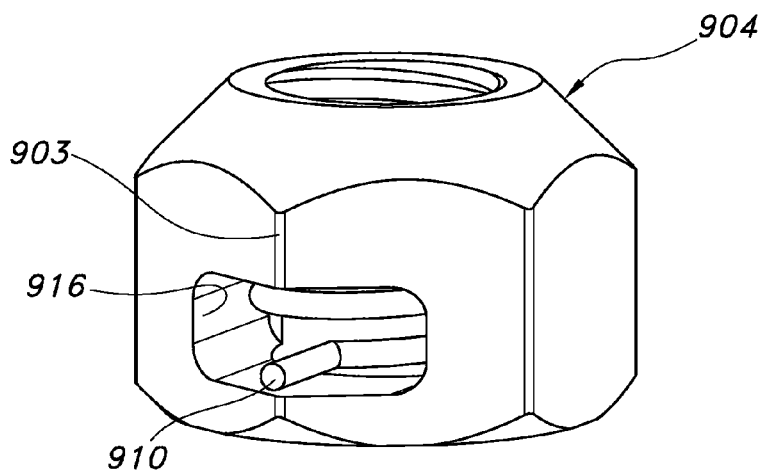
FIG. 30 is a perspective view of a nut in accordance with a seventh embodiment of the invention adapted for conventional socket wrenches.
Figure 31:
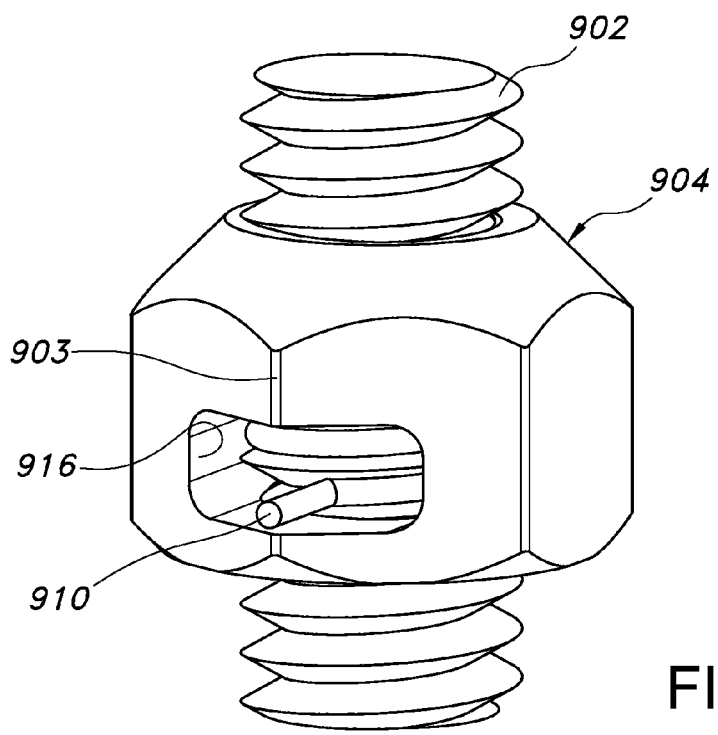
FIG. 31 is a perspective view of the nut of FIG. 30 mounted on a threaded member.

FIGS. 30-31 illustrate a one-way socket nut 904 configured so that a conventional socket wrench (not shown) can be used to both install and remove the nut, while maintaining the full benefit of the one-way function of the present technology. One example application of the nut 904 is for use as a battery cable clamp nut. Prior art battery clamp nuts loosen in service due to vibration of the cable, particularly in vehicle applications. The one-way nut 904 solves this problem.

Figure 32:
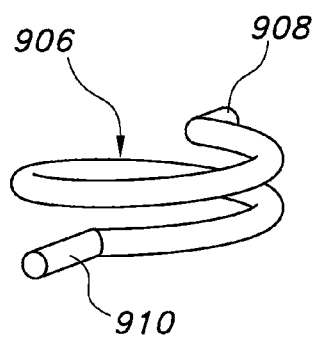
FIG. 32 is a perspective view of the coil spring removed from the nut of FIG. 30.

The slot portions 914 and 916 in the nut 904 are similar to the corresponding slots in the previously described embodiments, except that they are diametrically opposed, illustrating that the slots can have any desired circumferential orientation with respect to one another. It has been found that the spring 906 (see also FIG. 32) can be inserted into the nut 904 without using a retainer if the spring is wound with a pitch similar to the male thread. This allows the spring to expand sufficiently in the slot to retain itself by pushing on the top and bottom surfaces of the slot 916. Consequently, the bottom of the nut 904 does not need to be slotted. The spring 906 can be installed by inserting the spring through the slot 916. The width of the slot 916 is slightly smaller than the diameter of the spring 906, but the spring can deflect sufficiently to snap into place.

The one-way nut 904 appears to the user to function exactly like a prior art nut. The nut 904 therefore is "transparent" to the user. The nut components, most notably the tang 910, are configured and sized so that the tang 910 is actuated when a conventional socket is placed over the nut. The second tang 910 is located so that, when the nut 904 is installed on to a male thread 902, the second tang aligns with a corner 903 of the nut. As the nut is tightened onto the male thread, the spring expands in diameter sufficiently so that the second tang 910 lags in the rotation. Consequently, the end of the tang 910 moves into alignment with a corner of the hex nut. The length of the second tang 910 is such that, when a standard socket is used to remove the nut, the second tang comes into contact with the socket and therefore is prevented from rotating and tightening on the male thread 902. The socket is therefore able to remove the nut. When the socket is not engaged, the spring performs the one-way locking function in response to vibration and shear stress, and thermal cycling, which would tend to loosen a conventional nut.

Consequently, the nut 904 can be used as a direct substitute for conventional nuts across an extremely wide array of applications, offering an entirely new level of fastening integrity not available with conventional nuts.

Figure 33:
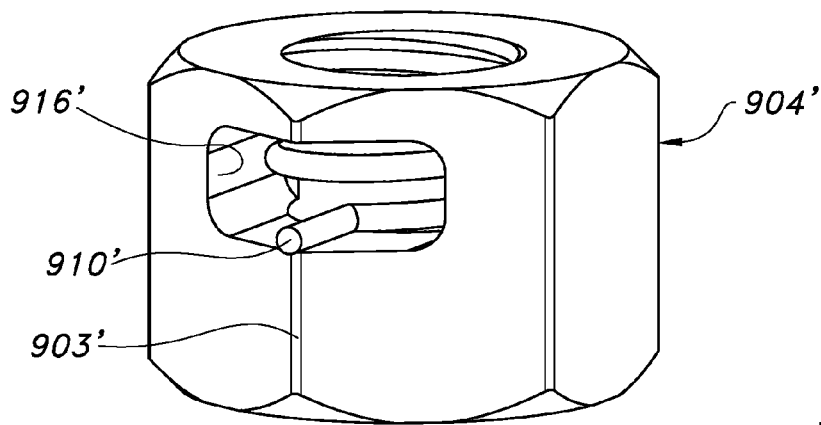
FIG. 33 is a perspective view of a variation of the nut illustrated in FIGS. 30-32.
Figure 35:
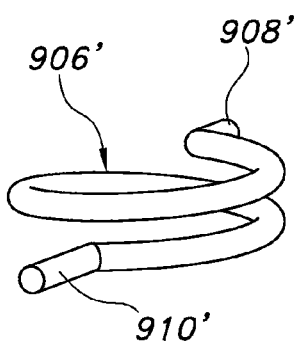
FIG. 35 is a perspective view of the coil spring removed from the nut of FIG. 33.
Figure 34:
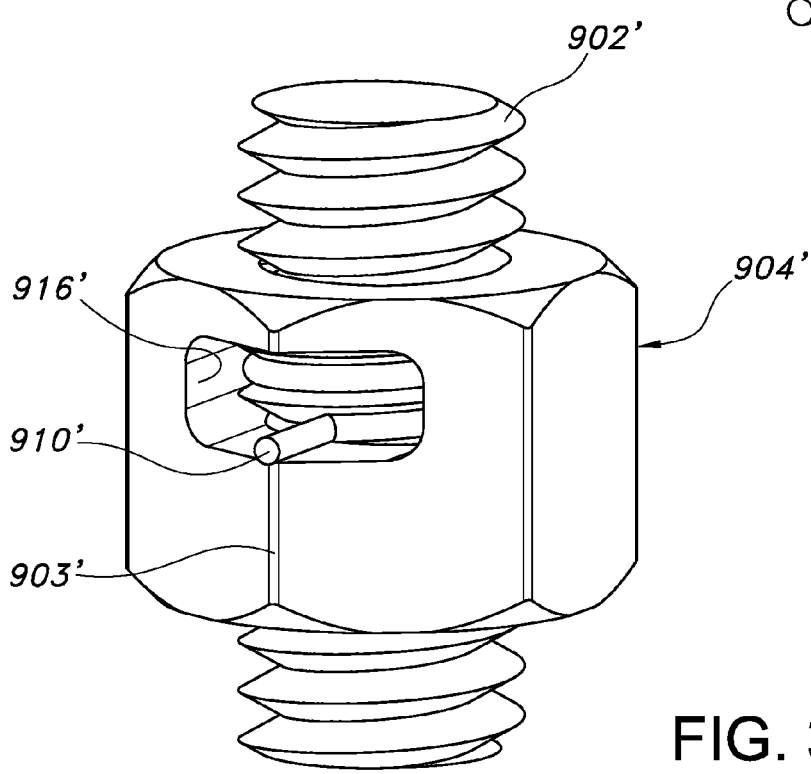
FIG. 34 is a perspective view of the nut of FIG. 33 mounted on a threaded member.
Figure 36:
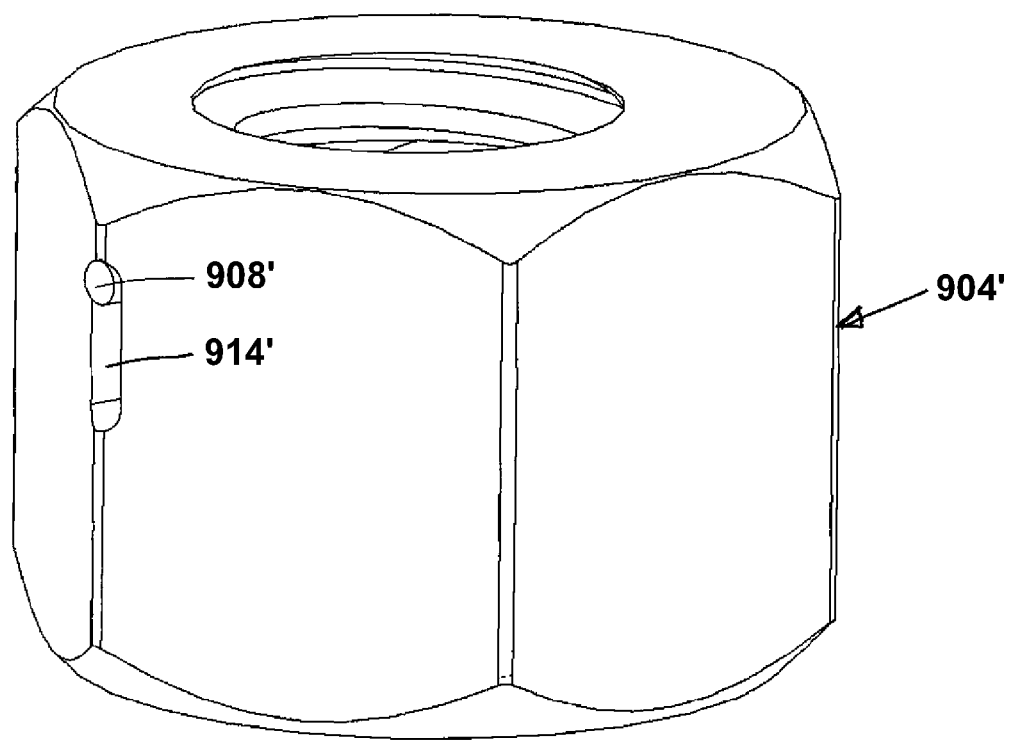
FIG. 36 is a rear perspective view of the nut of FIG. 33.

FIGS. 33-34 illustrate a variation 904' of the nut 904. Basically, the nut 904' is an inversion of the nut 904. Consequently, the male thread of the male member 902' enters the female thread first and then the spring 906', resulting in several additional advantages. First, this arrangement positions the threaded portion of the nut 904' adjacent the clamped surface, which allows standard torque settings to produce the same clamp-up stresses. Second, this arrangement eliminates stress on the nut 904' in the area enclosing the spring 906'. Third, this arrangement further enhances the "transparent" aspect of this embodiment. FIG. 36 illustrates the rear of the nut 904' including the first slot 914' and the first tang 908' within the first slot.

IX. Conclusion

Other applications of the present technology include critical component assemblies located in areas that may be difficult to access or service, and which are exposed to demanding load conditions. These applications include without limitation vehicles, appliances, mobile equipment chassis bolts, motor and engine assembly and mounting bolts, and hydraulic cylinder mounts. Among the many benefits of the present invention are more accurate torque loading, vibration resistance, joint shear strength, and reusability.

The present technology is also particularly suitable for mounting valuable or critical devices in locations vulnerable to theft or tampering. Such devices include without limitation sensors, antennas, pressure regulators, meters, fence fasteners, door hinge fasteners, and the like. The technology can be used for direct attachment and/or the attachment of covers. As described above, a release ring can be provided, and can be used by authorized personnel if removal is required. And as an additional or alternative security measure, the second tang can be recessed so that it is only accessible by a specially shaped key or tool.

The above descriptions are those of the current embodiments of the invention. Various alternations and changes can be made without departing from the spirit and broader aspects of the invention as set forth in the appended claims, which are to be interpreted in accordance with the principles of patent law, including the doctrine of equivalents.

The invention claimed is:

1. A locking threaded connection comprising:
   a nut having a plurality of corners and defining an internally threaded portion, the nut configured to be engaged by a conventional wrench socket, the nut defining a second slot communicating with the internally threaded portion through one of the corners;
   a male portion defining an externally threaded portion received within the female threaded portion; and
   a helical spring having a pitch corresponding to the pitch of the female and male threaded portions, the spring threadedly receiving the male portion, the spring permitting relative rotation of the male and female portions in a first direction, the spring preventing unintended relative rotation of the male and female portions in a second opposite direction, the spring permitting intended relative rotation of the male and female portions in the second direction, the spring including a second tang extending through the slot and aligned with the one corner, the second tang having a length such that the second tang is adapted to be engaged by the wrench socket when the wrench socket engages the nut, whereby during removal of the nut the tang is held in alignment with the nut corner by the wrench socket and the spring is prevented from tightening on the threaded member.

2. A locking threaded connection as defined in claim 1 wherein:
the nut defines a counterbore axially aligned with the internally threaded portion; and
the spring is fitted within the counterbore.

3. A locking threaded connection as defined in claim 1 wherein the spring includes a first tang secured against rotation within the nut.

4. A locking threaded connection as defined in claim 3 wherein:
the nut further defines a first tang-receiving slot;
the first tang is received within the first tang-receiving slot; and
the second tang is circumferentially movable within the second slot.

5. A locking threaded fastener comprising:
a fastener body defining a threaded bore, the fastener body comprising a nut having a plurality of corners, the body defining a second slot communicating with the bore through one of the corners, the nut adapted to be engaged by a conventional wrench socket; and
a helical spring within the bore, the spring permitting rotation of the fastener body with respect to a threaded member in a first direction, the spring restricting rotation of the fastener body with respect to the threaded member in a second direction opposite to the first direction, the spring including a second tang extending through the second slot and aligned with one of the nut corners, the second tang having a length such that the second tang is adapted to be engaged by the wrench socket when the wrench socket engages the fastener body, whereby during removal of the nut the tang is held in alignment with the nut corner by the wrench socket and the spring is prevented from tightening on the threaded member.

6. A locking threaded fastener as defined in claim 5 wherein:
the fastener body defines a first receiver; and
the spring includes a first tang fitted within the first receiver, the first receiver configured to prevent circumferential movement of the first tang.

7. A locking threaded fastener as defined in claim 5 wherein the second slot is configured to permit circumferential movement of the second tang.

8. A locking threaded fastener as defined in claim 5 wherein the nut is a hex nut.

9. A locking threaded fastener as defined in claim 5 wherein:
the fastener body defines a counterbore axially aligned with the threaded bore; and
the spring is fitted within the counterbore.

* * * * *